United States Patent [19]

Stokes et al.

[11] 4,101,960
[45] Jul. 18, 1978

[54] SCIENTIFIC PROCESSOR

[75] Inventors: Richard Arthur Stokes, West Chester; David Jerome Kuck, Seymour; Carl Anton Jensen, Malvern, all of Pa.

[73] Assignee: Burroughs Corporation, Detroit, Mich.

[21] Appl. No.: 782,374

[22] Filed: Mar. 29, 1977

[51] Int. Cl.$^2$ .................... G06F 15/16; G06F 15/20
[52] U.S. Cl. .................................................. 364/200
[58] Field of Search ........................ 364/200 MS File

[56] References Cited
U.S. PATENT DOCUMENTS

| | | | |
|---|---|---|---|
| 3,537,074 | 10/1970 | Stokes et al. | 364/200 |
| 3,573,854 | 4/1971 | Watson et al. | 364/200 |
| 3,623,011 | 11/1971 | Baynard, Jr. et al. | 364/200 |
| 3,643,227 | 2/1972 | Park et al. | 364/200 |
| 3,653,001 | 3/1972 | Ninke | 364/200 |
| 3,895,357 | 7/1975 | Schwartz et al. | 364/200 |
| 4,014,005 | 3/1977 | Fox et al. | 364/200 MS |

*Primary Examiner*—Harvey E. Springborn
*Attorney, Agent, or Firm*—Edward J. Feeney, Jr.; Edmund M. Chung; Leonard C. Brenner

[57] ABSTRACT

A single instruction multiple data (SIMD) processor particularly suited for scientific applications includes a high level language programmable front end processor, a parallel task processor having an array memory, a large very high speed secondary storage system having high speed I/O channels to the front end processor and the array memory, and a control unit directing the parallel task processor via a template control mechanism. In operation an entire task is transferred from the front end processor to the secondary storage system whereupon the task is executed on the parallel task processor under the control of the control unit thereby freeing the front end processor to perform general purpose I/O, and other tasks. Upon parallel task completion, the complete results thereof are transferred back to the front end processor from the secondary storage system. The array memory is associated with an alignment network for non-conflictingly storing and accessing linear vectors.

9 Claims, 13 Drawing Figures

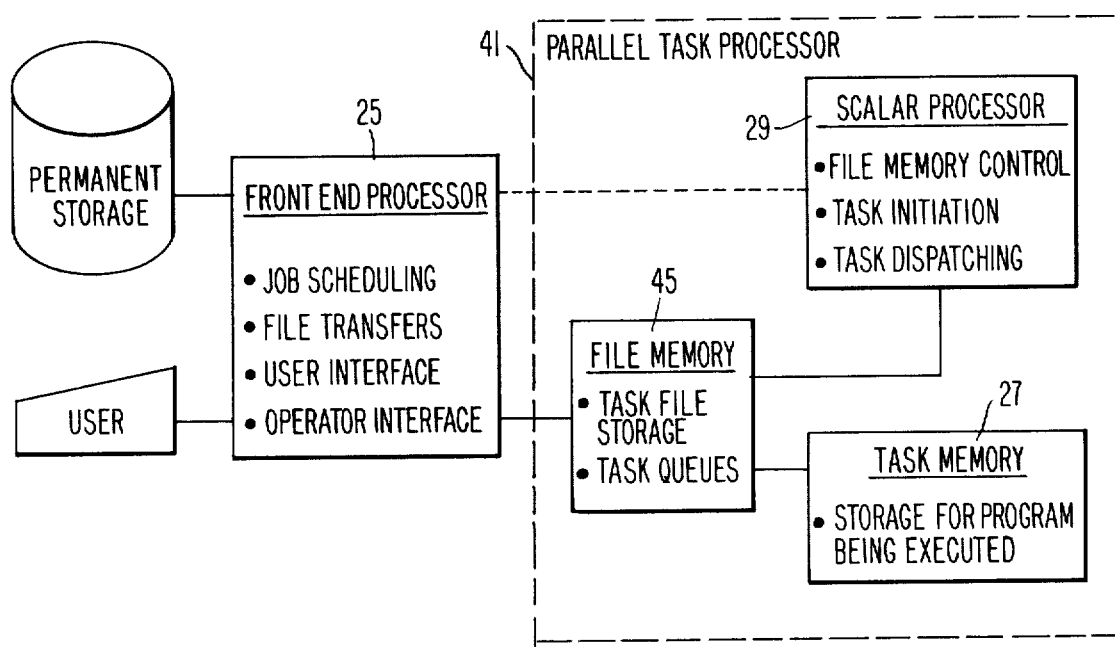

Fig.2

| STEP | LOCATION | ACTIVITY |
|---|---|---|
| 1 | FEP 25 | READ JOB CONTROL STATEMENTS AND USER SUPPLIED FILES. |
| 2 | FEP 25 | DECODE JOB CONTROL, SEE IF PTP 41 TASK IS PREPARED. IF YES, GO TO STEP 3. |
| 3 | FEP 25 | ASK PTP 41 FOR FILE MEMORY 13 SPACE. |
| 4 | PTP 41 | RESERVE FILE MEMORY 13, SET RESERVED FOR FEP 25 ACCESS, GIVE DESCRIPTOR TO FEP 25. |
| 5 | FEP 25 | TRANSMIT ALL OF TASK TO FILE MEMORY 13, SIGNAL PTP 41 WHEN FINISHED. |
| 6 | PTP 41 | DISPATCH AND INITIATE TASK. |
| 7 | PTP 41 | DO ALL TASK I/O TO/FROM FILE MEMORY 13. |
| 8 | PTP 41 | WRAP UP TASK ON TERMINATION AND GIVE FEP 25 DESCRIPTORS OF OUTPUT FILES. |
| 9 | PTP 41 | TRANSMIT OUTPUT FILES TO PERMANENT STORAGE, PRINTER, OR DISPLAY. |
| 10 | FEP 25 | GO TO STEP 2. |

Fig.3

| | OP CODE | 124 119 | | 95 | | | 71 | | 47 | 23 | 0 |
|---|---|---|---|---|---|---|---|---|---|---|---|
| BNDS | 1 | ///// | ///// | | BOS | | | LOS | ///// | ///// | ///// |
| VLEN | 2 | ///// | ///// | | L | | | K | ///// | ///// | ///// |
| VFRM | 3 | ///// | TN | OP1 | OP2 | OP3 | OP4 | ///// CB | ///// | SYN | PCR |
| | | | 111 | 103 | | 87 | 79 | 63 | | 39 | 19 0 |
| CNST | 4 | | FW | | | | | ///// | ///// | ///// | ///// |
| VOAM | 5 | | B | | V | | | i | d | | D |
| UVOD | 6 | | B | | V | | | ///// | ///// | ///// | ///// |
| UVOP | 7 | ///// | ///// | | i | | | ///// | ///// | ///// | ///// |
| UVOI | 10 | ///// | ///// | ///// | ///// | | | i | d | | D |
| VRAM | 11 | | B | | V | | | i | d | | D |
| UVRD | 12 | | B | | V | | | ///// | ///// | ///// | ///// |
| UVRP | 13 | ///// | ///// | | i | | | ///// | ///// | ///// | ///// |
| UVRI | 14 | ///// | ///// | ///// | ///// | | | i | d | | D |
| SKLTM | 15 | | B | | V | | | i | d | | |
| SKLAM | 16 | | B | | V | | | i | d | | |
| RAD1 | 17 | | B | | V | | | ///// | ///// | ///// | ///// |
| RAD2 | 20 | ///// | ///// | ///// | ///// | ///// | ///// | ///// | ///// | ///// | ///// |
| BV0 | 21 | ///// | ///// | | BVB | | | BVV | ///// | ///// | ///// |
| BVR | 22 | ///// | ///// | | BVB | | | BVV | TMADD | | ///// |
| CV0 | 23 | ///// | ///// | | BC | | | LC | ///// | ///// | ///// |
| CVR | 24 | ///// | ///// | | BC | | | LC | ///// | ///// | ///// |

*Fig.12*

SCIENTIFIC PROCESSOR

CROSS REFERENCES RELATED TO APPLICATION

In copending application Ser. No. 682,526, for a "Multidimensional Parallel Access Computer Memory System", filed May 3, 1976, in the name of D. H. Lawrie et al and assigned to the assignee of the present invention, there is described and claimed a parallel memory array and parallel processor alignment system for storing and non-conflictingly accessing linear vectors. This application is hereby incorporated by reference.

BACKGROUND OF THE INVENTION

This invention relates generally to large scale data processing systems and more particularly, to the architecture of large single instruction multiple data (SIMD) type parallel processing arrays for scientific processing applications.

In the development of digital computers the most important design goal has always been to maximize their operating speed, i.e., the amount of data that can be processed in a unit of time. It has become increasingly apparent in recent times that two important limiting conditions exist within the present framework of computer design. These are the limits of component speed and of serial machine organization. To overstep these limitations high speed parallel processing systems have been developed providing an array of processing elements under the control of a single control unit.

As speed requirements of computation have continued to increase, systems employing greater numbers of parallel memory modules have been developed. One such system has in the order of 64 parallel memories, see U.S. Pat. No. 3,537,074, issued Oct. 27, 1970 to R. A. Stokes et al, and assigned to the assignee of the present invention. However, parallel processors have not been without their own problems. For example, a parallel array often has great capacity that is unusable because of limitations imposed by the I/O channels feeding data to it. Further, the parallel array being tailored to vector or parallel processing performs relatively slowly while handling scalar tasks.

Also, parallel processors being architecturally so far removed from scalar processors often are hard to program and have limited ability to function with standard high level languages such as Fortran.

Finally, prior art parallel processors often have difficulty handling matrix calculations which are often the heart of scientific problems. Unless each element of a matrix vector is stored in a different memory module in the array memory that vector cannot be accessed in parallel and a memory conflict occurs slowing and complicating matrix calculations.

OBJECTS AND SUMMARY OF THE INVENTION

It is therefore an object of this invention to improve single instruction multiple data (SIMD) computers.

It is a further object of this invention to provide a large scale parallel processing computer system which may be readily programmed in a high level language.

It is a further object of this invention to provide a parallel processing system which also efficiently processes scalar tasks.

It is yet a further object of the invention to provide a parallel processing system which minimizes processing efficiency deteriorations introduced by I/O limitations between the front end or management processor and the parallel task processor.

It is still a further object of this invention to provide an array processing system which is conflict free for processing multi-dimensional arrays and which operates in an efficient pipelined manner.

In carrying out these and other objects of this invention, there is provided a scalar front end processor, a parallel processing array, a control unit for controlling the parallel processing array and a large high speed secondary storage system having high speed I/O paths to the front end processor and to the memory modules of the parallel processing array.

In operation, the front end processor is programmed in a high level language and transfers complete prallel tasks to the secondary storage system whereupon complete control for the parallel processing operation is directed by the control unit thereby freeing the front end processor to perform general purpose or other tasks. Upon parallel task completion, complete files are transferred back to the front end processor from the secondary storage system.

The parallel processing array efficiently processes vector elements in a parallel locked-step fashion under template control provided by the control unit. The memory array of the parallel processor provides conflict-free access to multi-dimensional arrays stored therein.

Various other objects and advantages and features of this invention will become more fully apparent in the following specification with its appended claims and accompanying drawings wherein:

BRIEF DESCRIPTION OF THE DRAWINGS

FIG. 2 depicts the operation and partitioning of the scientific processing architecture of FIG. 1 from a Master Control Program point of view;

FIG. 3 lists the steps required to transfer and complete a job from the front end processor to the parallel task processor of the scientific processing architecture of FIG. 1;

FIG. 12 illustrates the various kinds of parameter groups that are transferred from the scalar processing unit to the array control unit and stored therein the vector function initialization and validation unit shown in FIG. 10.

DESCRIPTION OF THE PREFERRED EMBODIMENT

ARCHITECTURAL APPROACH

Figure 1:
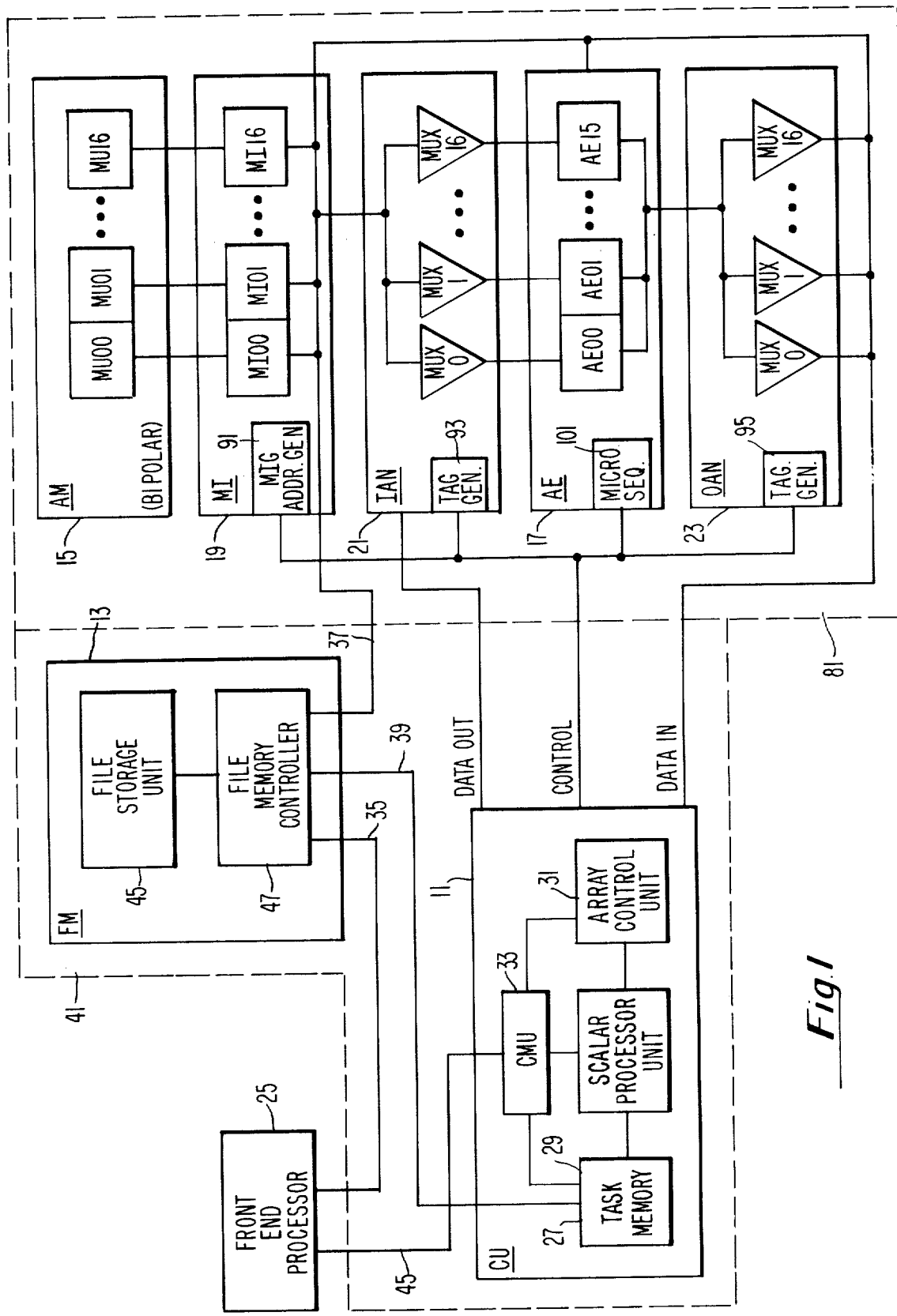
FIG. 1 is a block diagram showing the scientific processing architecture of the present invention.

The scientific processing architecture of the present invention places a scientific job in a computational envelope which responds quickly and with high bandwidth to the executing program's instruction stream. In the preferred embodiment, see FIG. 1, the computational envelope includes within, a Control Unit 11, a File Memory 13, an Array Memory 15 and an Arithmetic Element 17. A Memory Interface 19, an Input Alignment Network 21, and an Output Alignment Network 23 are provided to channel data flow between the File Memory 13 and the Array Memory 15 and between the Array Memory 15 and the Arithmetic Elements 17. While a Front End Processor 25 is the system manager from an overall task management viewpoint, the Control Unit 11 is in direct and complete control of actual task execution and I/O operations inside the computational envelope and makes requests of the Front End Processor 25. To facilitate a more complete understanding of the function and architecture of the present invention, the above-mentioned elements within the computational envelope and the Front End Processor 25 will all be described briefly with continued reference to FIG. 1, followed by a more detailed explanation of the elements and the interfaces therebetween.

The Front End Processor 25 functions as a host processor in that it handles the true I/O, user interfacing, archival storage, and building of job queues for processing within the computational envelope. In the preferred embodiment a large systems processor, namely, a Burroughs B7800, is selected as the Front End Processor 25.

The Control unit 19 comprises four main units; a Task Memory 27, a Scalar Processor Unit 29, an Array Control Unit 31 and a Control Maintenance Unit 33. The Control Unit 11 together with the File Memory 13 is capable of functioning independently of the Front End Processor 25 while performing scalar and vector tasks thereby freeing the Front End Processor 25 and allowing it to perform other tasks for which it is required or best suited.

The Task Memory 27 stores the Master Control Program (MCP), parts of the object program code, scalars and descriptors. Preferrably storage capability of 64K words is provided with expandability to 256K words.

The Scalar Processor Unit 29 which provides the system intelligence within the computational envelope, executes program code which is stored in bytes in the Task Memory 27. The Scalar Processor Unit 29 combines instruction buffering, variable length instructions, relative addressing of the Task Memory 27, use of an internal local memory, fast arithmetic synchronizers, maskable interrupts and other features which enhance Fortran program execution. Instruction processing is pipelined. Vector operations and parameters are assembled in an internal local memory before being sent to the Array Control Unit 31 for queuing.

The Array Control Unit 31 receives and queues vector operations and parameters from the Scalar Processor Unit 29 and generates the microsequence for their execution by the Arithmetic Elements 17. Memory Indexing parameters and tag parameters are generated and updated for each set of vector elements.

The Control Maintenance Unit 33 serves as an interface between the Front End Processor 25 and the rest of the Control Unit 11 for initialization, control data communication, and maintenance purposes. It receives commands from the Front End Processor 25 and monitors system error detection circuits (not shown) and reports detected errors to the Front End Processor 25. The Control Maintenance Unit 33 has access to critical data paths and controls in the Scalar Processor Unit 29, the Array Control Unit 31 and the Task Memory 27 for fault location purposes.

The File Memory 13 has a high speed I/O data path 35 to the Front End Processor 25 to facilitate fast data flow to and from the Array Memory 15. In operation, files of the program code are brought in from the Front End Processor 25 and temporarily stored in the File Memory 13 and the Task Memory 27. The large high speed File Memory 13 with its high speed data paths 35 and 37 is a most important element in the present invention and in the physical realization of the computational envelope approach.

The parallel processing array comprising the Array Memory 15, the Memory Indexing 19, the Input Alignment Network 21, the Arithmetic Elements 17, and the Output Alignment Network receives data from the File Memory 13 and processes the data in a parallel lock-step operation in the Arithmetic Elements 17 under direction from the Array Control Unit 31. A more detailed explanation of the array operation for processing linear vectors is given in U.S. Pat. application, Ser. No. 682,526, filed May 3, 1976, for a "Multidimensional Parallel Access Computer Memory System", by D. H. Lawrie et al, and assigned to the assignee of the present invention, the application being incorporated herein by reference. Basically, data is read from the File Memory 13 through the Memory Indexing 19 into the Array Memory 15. Thereafter, the data is fed through the Input Alignment Network 21 for proper aligning and is processed in parallel in lock-step fashion by the Arithmetic Elements 17. Thereafter, the data is realigned for storage or further processing by the Output Alignment Network 23.

The scientific processing architecture of the present invention having been briefly described above will now be detailed as implemented in the preferred embodiment thereof.

FRONT END PROCESSOR

The Front End Processor functions as the user interface, the basic job compiler, and the interface to the rest of the systems hereinafter referred toaas the Parallel Task Processor 41 comprising all the function elements of FIG. 1 except the Front End Processor 25. The I/O between the Parallel Task Processor 41 and the Front End Processor 25 is relatively simple due to dedicated storage in the form of the File Memory 13. As will be detailed hereinafter, the Front End Processor 25 gives parallel job tasks to the Parallel Task Processor 41 and is thereafter relatively isolated from the Parallel Task Processor 41 until task completion. Thus, the Front End Processor 25 is freed for a period of time to perform other functions, such as general purpose processing. In this manner a typical scientific problem comprising both general purpose and parallel tasks may be handled most efficiently by partitioning the scalar tasks to the Front End Processor 25 and the parallel tasks to the Parallel Task Processor 41.

In order to ease user interface problems and to simplify programming requirements, the Front End Processor 25 is implemented as a large scale Fortran programmable computer, preferably a Burroughs B7800. In the B7700 a Master Control Program (MCP) allows the user to gain access to the Parallel Task Processor 41 via a standard B6800/B7800 Work Flow Language. In alternative embodiments, a counterpart to the B6800/B7800 Work Flow Language is employed such as a Job Control Language. In either case, the Front End Processor 25 and the Parallel Task Processor 41 appear to be a single system from the point of view of job control. Under this arrangement, all standard Front End Processor 25 capabilities are invoked as though they are extensions to the standard Front End Processor capabilities. Thus, a single job can use all the facilities of the system.

With reference to FIG. 2 it is apparent that in one sense there are two Master Control Programs and yet in another sense, the MCP on the Parallel Task Processor 41 is merely an extension of the one on the Front End Processor 25. It is important to the present invention, however, that the Master Control Program in the Parallel Task Processor be in complete control of the Parallel Task Processor 41. The Front End Processor 25 must request the Parallel Task Processor 41 to perform certain functions. This is a major advantage over ILLIAC IV and other prior art systems where the management or Front End Processor always had full control.

In step 1, with reference to FIG. 3, the Front End Processor 25 interprets the work flow language program for transferring communications with the Parallel Task Processor 41. The word "interpret" is used rather than "compile" because the Work Flow Language has a compiler associated with it. Thus, the Work Flow Language compiler merely compiles the Work Flow Language statement to a form which is later interpreted by the overall Scientific Processor. In a dynamic state, when the operating system encounters a Work Flow Language expression, for example, as to compile a Parallel Task Processor 41 FORTRAN Program, the Front End Processor 25 calls the Parallel Task Processor 41 compiler and locates the input file for the compiler and tells the compiler to run. The input file will be the source program. When the computation is done there will be another work flow statement which tells it what to do with the results of the computation. Normally, the object code generated by the compilation is shifted over to the Parallel Task Processor 41 to run there. Therefore, there would be another work flow statement requesting the transfer of the result of the compilation to be transferred to the Parallel Task Processor 41. At the same time, a list of statements would be encountered which would tell which files are to go along with the object code which are needed by the object code to run. The above procedure is typical of matters handled by the Work Flow Language. Work Flow Language is merely a set of instructions describing how a program is to flow through the system.

Another matter that the Work Flow Language handles is that it can have one task running on the Parallel Task Processor 41 while executing another task on the Front End Processor 25, and when both are completed, to compare the results and to start up a third program based on the computation. The Work Flow Language thus can cause part of a job to be computed on one machine and part on another. Thus tasks may be partitioned and executed on the machine which is best optimized to perform that task.

In step 2, the job is placed in queue depending on its priority. There is queue for long jobs and one for short jobs, for high priority and low priority jobs. Other characteristics also effect its position in the queue. The queues are inspected by the Master Control Program (MCP) of the operating system of the Front End Processor 25. When conditions allow, the next entry is taken from the queue and run. The queues allow the job priorities to be correct.

In step 3, the Job File Memory 13 reservation is made and the job is started. This is accomplished by both machines. The Front End Processor 25 performs a MCP to MCP communications with the Parallel Task Processor 41 and in effect, asks if it is ready for the next job. When the Parallel Task Processor 41 responds affirmatively, memory space in the File Storage Unit 13 is reserved for the job and the Parallel Task Processor 41 gives to the Front End Processor 25 the descriptors which indicate where the job is to be stored.

With reference again to FIG. 1, it is seen that a very high speed I/O path 35 connects the Front End Processor 25 and the Parallel Task Processor 41. Also, a path interconnects the Front End Processor 25 and the Parallel Task Processor 41 for the purpose of MCP conversations. This MCP path 45 actually comprises two unidirectional ports. Protocol along the communications path 45 is quite similar to that in data communication paths. It is in essence, a message-to-message protocol. A short message is decoded before the next is communicated. The buffers are small, and in essence a little packet is transferred at a time.

In step 4, again with reference to FIG. 3, after a Memory File 13 reservation is made, the Front End Processor 25, places the tasks in the Parallel Task Processor 41 task queue and the job is further decoded into tasks which are placed in a queue. A job comprises at least one task. The Parallel Task Processor 41 makes the File memory 13 allocations.

In step 5, the Front End Processor 25 takes information from its own discs and files and transfers the necessary files to the File Memory 13 in the Parallel Task Processor 41.

In step 6, the Parallel Task Processor executes the task.

In step 7, a Parallel Task Processor 41 transfers the necesary files from the File Memory 13.

In step 8, the Parallel Task Processor 41 informs the Front End Processor 25 that is through with the job and it lists the files which are to be transferred back and erases others if there are any. The Front End Processor 25 acutally performs the transfer back. The Parallel Task Processor 41, in essence, says "I am done and here are the descriptors, pick up the files". The Front End Processor 25 then takes care of the transfer and notifies the parallel Task Processor 41 that the transfer is completed. The descriptors are the description of the file from a hardware point of view. The descriptors are passed from the Parallel Task Processor 41 are the actual hardware descriptors which the Front End processor 25 will give to the hardware to cause it to do what is requested. Each descriptor designates how large its associated file is and where the associated file is located. The job executes out of the Array Memory 15 and is then packed back into the File Memory 13 before the Front End Processor 25 is notified that the job is completed. Thus, the Front End Processor 25 extracts only from File Memory 13. The Parallel Task Processor 41 wraps the job up in a package in the File Memory 13 and notifies the Front End Processor 25.

In step 9, the actual transfer of the output files to permanent storage occurs.

In step 10, finally, having completed a job, the Front End Processor 25 goes to the next job as indicated by step 2.

The word "task" is used in the Parallel Task Processor 41 is in essence a complete job. The Work Flow Language concept is so powerful that several tasks may be performed under a single job. However, each task may be considered a complete job in itself. The task is brought into File Memory 13 and deposited there by the Front End Processor 25. The Front End Processor 25 may, if there is room in the File Memory 13, queue up several tasks. Then the Parallel Task Processor 41 executes the tasks in sequence by taking them out of the File Memory 13 and returning them to the File Memory 13. Following this, the Front End Processor 25 is notified that a task is completed and is requested to transfer it back. In the steady state one task is running, one task is being loaded into the Parallel Task Processor 41 and one task is being removed from the Parallel Task Processor 41. Thus, the loading and unloading of tasks are overlapped. As soon as the Parallel Task Processor 41 is finished with one task it is prepared to go on to the next. Thus, the I/O channel 35 is kept busy.

In the preferred embodiment, a Proxy Task is performed for coding convenience on the Front End Processor 25. The Proxy Task is in essence the dummy job which is employed to take advantage of the work flow language capability of permitting the user to address both the Front End Processor 25 and the Parallel Task Processor 41 as though they were different aspects of the same overall machine. When the Front End Processor 25 starts up a Parallel Task Processor 41 task, it also starts up a Proxy Task at the same time and when it finishes the Parallel Task Processor 41 task the Proxy Task is halted and destroyed. Some of the messages between the Front End Processor 25 and the Parallel Task Processor 41 go through the Proxy Task. That is its main function. The Front End Processor 25 MCP performs as though it is running a job on the Front End Processor 25 because of the guise of the Front End Processor 25 Proxy Task. The Proxy Task allows one to get to all of the resources of the Front End Processor 25 while using the standard operating system of the Front End Processor 25. The Proxy Task occupies only a few hundred words of memory and is active only during those periods when communications are occurring between the Front End 25 and the Parallel Task Processor 41.

In the Front End Processor operating system in order for the Front End Processor 25 to make use of the queues which it has, there has to be tasks associated with the queue. In that sense, the Proxy Task is the task which the queues are driving. The only task which the queues, in a sense, are officially aware of. In prior art machines such as the above-mentioned ILLIAC IV machine, there is something called an independent runner which in basic essence is something like the Proxy Task described above.

File Memory

The main communications paths between the Front End Processor 25 and the Parallel Task Processor 41 involve the File Memory 13. Because of this, the interface procedures are kept relatively clear and simple as above-described. With continued reference to FIG. 1 in general, and in particular reference now to FIG. 4, it is appreciated that the two main functional sections of the File Memory 13 are the File Storage Unit 43 and the File Memory Controller 45.

File Storage Unit

The File Storage Unit 43 provides high performance dedicated secondary storage. In the preferred embodiment, the File Storage Unit 43 is implemented by charged coupled devices having a maximum capacity of 64 million words and partitioned into a maximum of eight distinct modules for reliability. In a typical systems application of the present invention, the File Storage Unit 43 contains eight to sixteen megawords of 56 bits. Since only one module is required to be in operation at a time, data refreshing will require less than 10% of the File Memory 13 time.

In alternate embodiments for satisfying differing cost-performance criteria, the File Storage Unit 43 may be implemented by either MOS RAM chips or disc technology.

File Memory Controller

Figure 4:
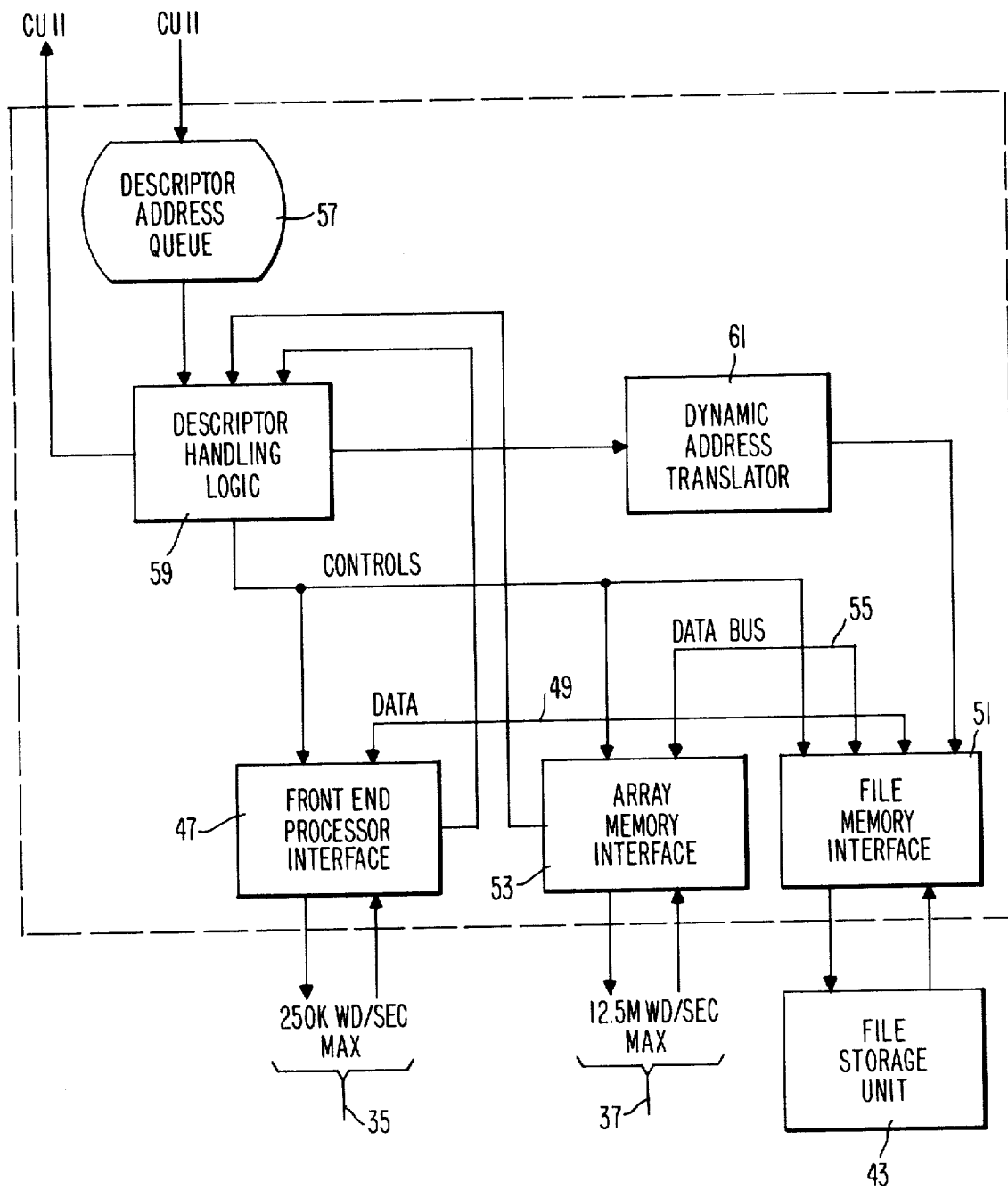
FIG. 4 is a detailed block diagram of a large high-speed secondary storage unit used in the parallel task processor illsutrated in FIG. 1.

The File Memory Controller 45 functions as the main buffer and interface between the File Storage Unit 43 and the Front End Processor 25, the Array Memory 15, and the Control Unit 11, see FIG. 4. Thus, the File Memory Controller 45 is in essence an I/O Controller.

The I/O Data Communications of the Front End Processor 25 is maintained preferably at a rate of 250 kilowords per second maximum under the control of the Front End Processor Interface Unit 47. The Front End Processor Interface Unit 47 feeds data over data path 49 to and from the File Memory Interface 51. The File Memory Interface 51 handles data communications with the File Storage Unit 43 at a rate in the order of 12.5 million words per second for a CCD implementation of the File Storage Unit 43 and at a rate of 100 kilowords per second for a disc implementation thereof. In like manner, the Array Memory 53 handles data and communications with the Array Memory 15 at a rate in the order of 12.5 million words per second maximum. A Data Bus 55 is provided between the Array Memory Unit Interface 53 and the File Memory Interface 51.

In operation, descriptors are fed from the control Unit 11 to a descriptor address queue 57. The descriptor address queue 57 may preferably accept up to 30 descriptors at a time. Thus, the File Memory Controller 45 is able to accept more than one address at a time. As the descriptors are queued up, they are peeled off one at a time under the control and management of the Descriptor Handling Logic 59. The Descriptor Handling Logic 59 generates the necessary synchronizing and timing controls associated with the descriptors to properly handle the differing bandwidths associated with the Front End Interface 47, the Array Memory Interface 53 and the File Memory Interface 51. To permit the File Storage Unit 43 to have virtual addresses, a dynamic address translator 61 is provided. Thus all of the advantages of virtual addressing accrue to the File Storage Unit 43. For example, once a program is linked it can have all the proper addresses linked into it at that time. The addresses do not have to be modified. Thus the operating system is then allowed to move data around the File Storage Unit 43 to repack the File Storage Unit 43 in order to make maximum use of the space available. The operating system then instead of having to redo the addresses, only has to redo the pointers associated with the Dynamic Address Translator 61. Virtual addressing is common for main memories and has incorporated into the File Memory Controller 45 to provide virtual I/O addresses. It is appreciated, that the Descriptor Address Queue 57 may in implementation, comprise a plurality of queues such as low priority queue and a high priority queue.

Control Unit

Figure 5:
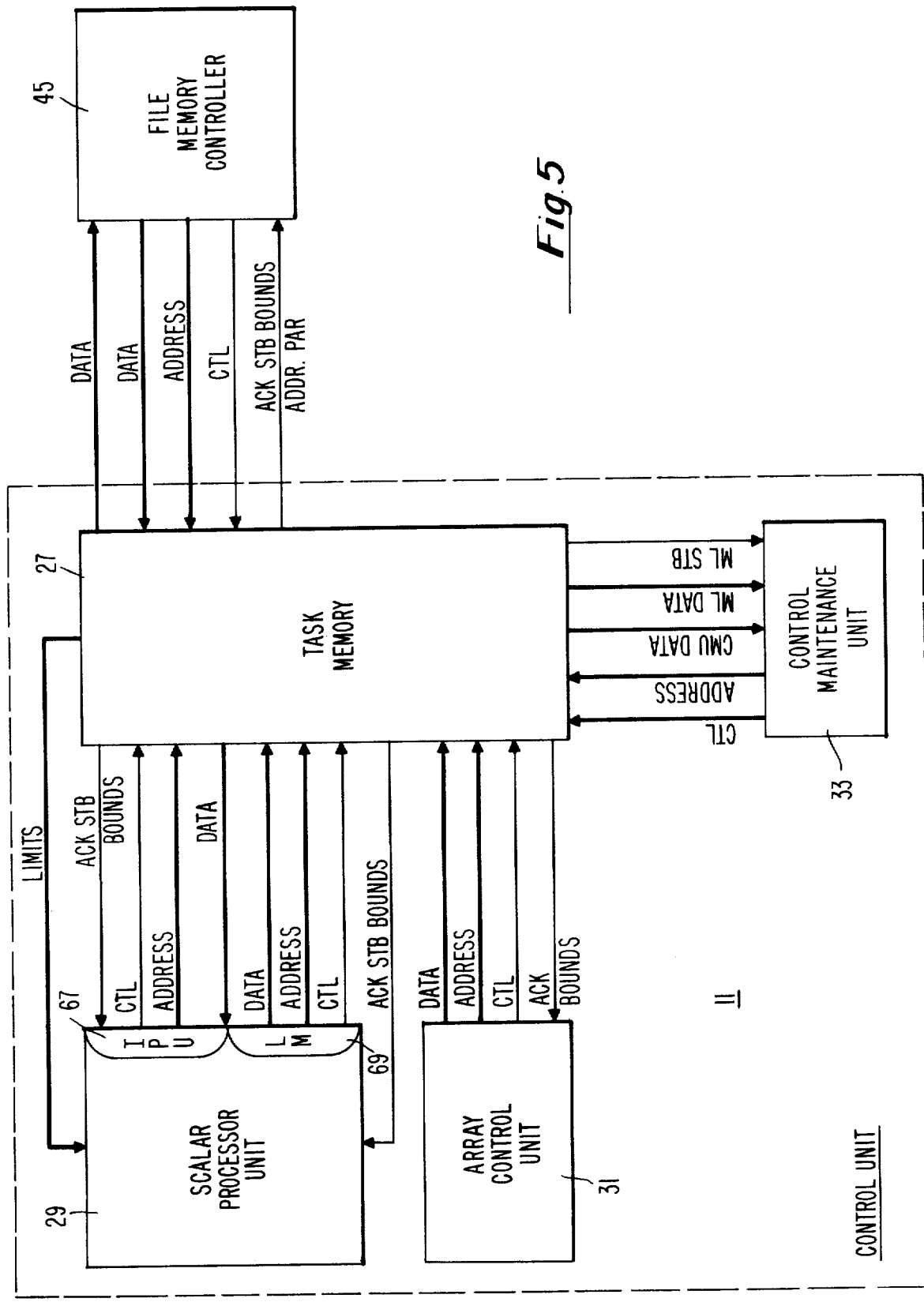
FIG. 5 is a block diagram illustrating the operating environment of the task memory of the control unit shown in FIG. 1.

The File Memory Controller 45 receives descriptors and other data from the Control Unit 11. The Control Unit 11 comprises the Task Memory 27, the Scalar Processor Unit 29, the Array Control Unit 31, and the Control Maintenance Unit 33, see FIG. 5.

Task Memory

The Task Memory 27 provides the storage of both code and data for tasks executing on the Control Unit 11 of the Parallel Task Processor 41. See FIG. 6. The storage supports scalar operations and control functions for both user tasks and the resident operating system. The Task Memory 27 is a linear list of full words, addressed by base relative, positive integers. Access is controlled by an ordered priority structure.

The Task Memory 27 provides random access storage. In the preferred embodiment, the memory size is from 65,536 words to 264,144 words in 65,536 word increments. The word size is 48 bits of data with 7 bits of Hamming Code plus an unused bit in each word, making the word 56 bits. It is structured such that four contiguous words at a 4-word boundary may be simultaneously accessed, provided that all accesses are for the same function (Read or Write).

Only one request is accepted for each access cycle. An access cycle may start on any minor clock and requires two minor clocks before another access cycle may be started. For any minor clock that an access may start, the highest priority request present at that time is accepted. There are five requestors with the following priority: (1) Control Maintenance Unit 33 (only used during diagnostics); (2) File Memory Control 45 (I/O); (3) Array Control Unit 31 (Bit Vectors and Scalar Results); Scalar Processor Unit 29 (IPU for instruction fetch); and Scalar Processor Unit 29 (LM for operands). Note that the SPU 29 has two distinct requestors: the Instruction Processing Unit, hereinafter the IPU 67 and the Local Memory, hereinafter the LM 69. These two requestors will be discussed later in more detail along with a general description of the SPU 29.

The given address is relative to a register contained base value in the Task Memory 27, except in supervisor mode (zeros are substituted). All addresses are unsigned integers. The selected address (based on priority resolution) is added to the base for application to the memory units. A Memory Limit check is provided for the top of the memory. The same sub-address is provided for each of the four Memory Module Units 59, 61, 63 and 65 of the Task Memory 27, see FIG. 6.

Figure 6:
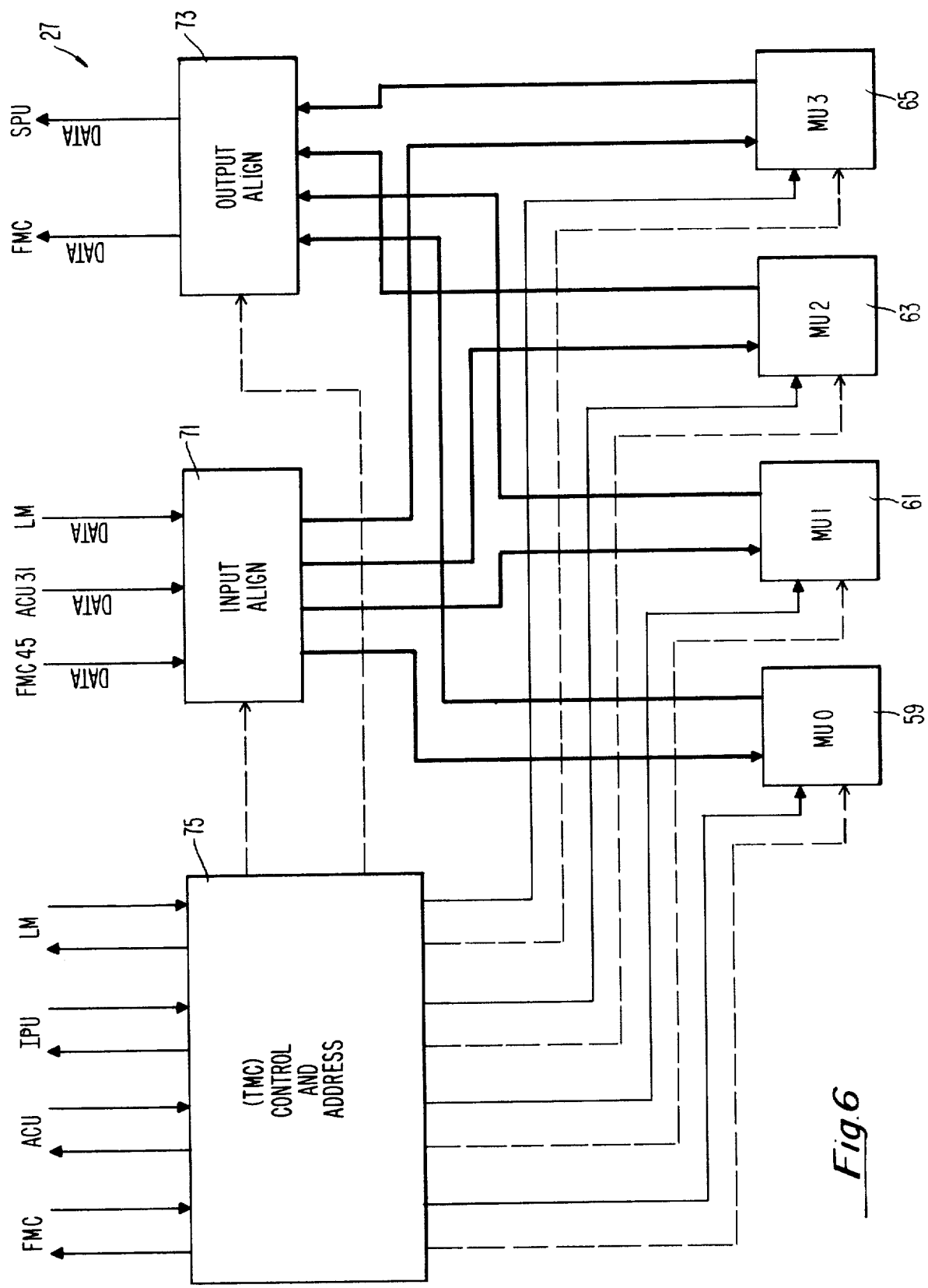
FIG. 6 is a detailed block diagram depicting the features of the task memory of FIG. 5.

Data provided to the Memory Module Units 59, 61, 63 and 65 is aligned to the correct module for single word operations, see FIG. 6. Four word operations will take the data as presented. Data fetched from the Memory Module Units 59, 61, 63 and 65 is sent as it appears.

In the preferred embodiment, the Task Memory 27 includes such error detecting mechanisms as Hamming Code, bounds error, parity check on data being received, Memory Limit checks, and two hardware failure checks, the ACK Stack Check, and an address parity check on lines to the Memory Module Units 59, 61, 63, and 65. Information relating to detected errors is communicated to the Control Maintenance Unit 33 for logging of such information for corrective and diagnostic procedures. Error detection being well-known in the art, will be only briefly referred to in the following discussion so as not to unnecessarily complicate a utilitarian understanding of the present scientific processor architecture invention.

Figure 7:
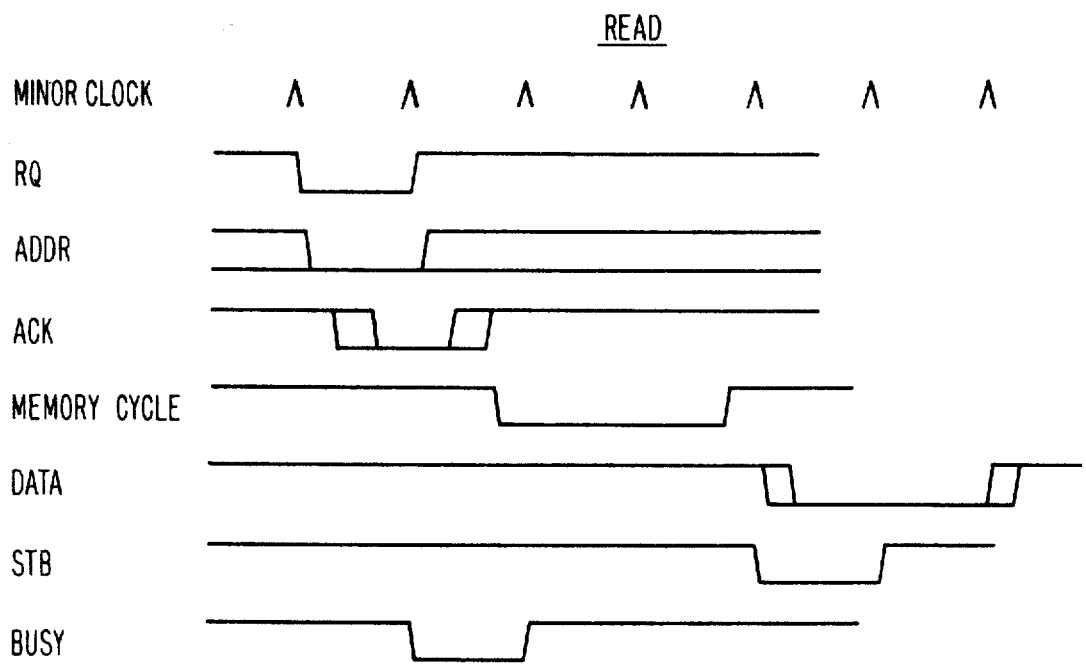
FIG. 7 is a timing diagram illustrating the procedure for fetching from the task memory of FIG. 6.

To fetch a word or four words from Task Memory 27, see FIG. 7, the requestor must put a true signal on the request line and put the address on his address lines. If the requestor is the highest priority at that time and the memory is not busy, the requestor's address will be added to a register contained base address (if in user mode) and stored. At the same time, the requestor's acknowledge (ACK) line will be driven true. In the next clock time, the memory will be busy while the address is sent to the memory unit. Then a memory cycle will be initiated and will take two minor clocks to finish. Finally in the fourth clock period the data will be sent to the requestor along with a strobe (STB) signal. The requestor then loads his data on the fifth clock edge after he received the ACK signal. The data will remain stable until the sixth clock edge. The requestor may change his address and request lines on the next clock edge after he receives the ACK signal.

Figure 8:
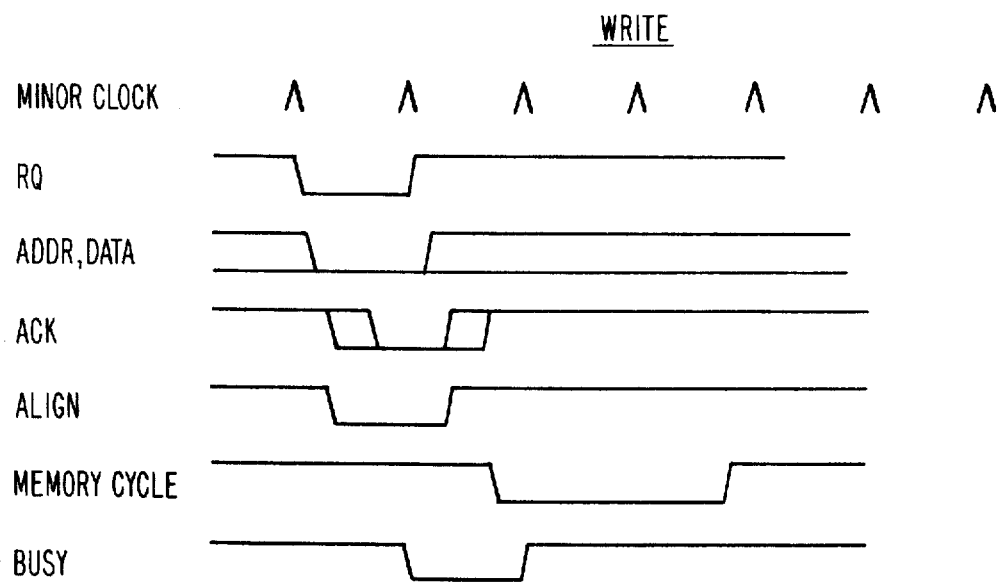
FIG. 8 is a timing diagram depicting the procedures for writing into the task memory of FIG. 6.

To store a word or four words (for FMC) in Task Memory 27, see FIG. 8, the requestor does everything he did for a fetch operation, but instead puts a true on the read/write line and at the same time that the requestor puts the address on his address lines he also puts the data on the data lines. The store address will be handled in the same manner as a fetch address. The requestor will receive an ACK but not a STB signal. The requestor may change all lines to the memory on the next clock edge after he receives an ACK signal.

The Input Alignment Logic 71, see FIG. 6, selects the requestors data and aligns it with the selected Memory Module Unit(s) 59, 61, 63 65. The logic will align a word to all four modules, 59, 61, 63 and 65 for one word writes, or it will align four words to four modules as presented, for FMC four word write. The data is aligned and saved in a first cycle and then sent to the Memory Module Units 59, 61, 63 and 65 in a subsequent cycle.

The Output Alignment Logic 73, see FIG. 6, selects the requested Memory Module Units 59, 61, 63 and 65 and presents it (them) to the requestor. The logic 73 will present four words directly to the requestor (for four word reads) or will present one word in the position it appears (for one word reads). At the same time that the data is made available to the requestor, a strobe (STB) signal from the Task Memory Controller, TMC 75 is sent to the requestor. The data is then held until the next clock edge.

The control and Address Generator 75, see FIG. 6, provides the timing, control, and address generating signals for the Input Alignment Network 71, the Output Alignment Network 73, and the Memory Module Units 59, 61, 63 and 65. In operation, the Control and Address Generator 75 functions in six distinct phases. First, the requestor is selected according to priority and inputted address and data are stored while controls are set for later phases. Second, the received information is sent to the Memory Module Units 59, 61, 63 and 65. In the third phase, the TMC 75 sends written enable data to the Memory Module Units 59, 61, 63 and 65. In the fourth phase error information is stored and data is outputted from the Memory Module Units 59, 61, 63 and 65. In phase five data is sent to the requestor and in phase six, error messages are sent to the CMU 33 for logging, and diagnostics.

SCALAR PROCESSOR UNIT

The Scalar Processor Unit 29 is the primary controlling element of the Parallel Task Processor 41, see FIG. 1. It is the implementation link between the compiled program and unit executions. It performs the functions of instruction stream control, scalar arithmetics, vector parameter preprocessing, input/output initiation, and resource allocation.

More specifically, the SPU 29 fetches all instructions used by the Parallel Task Processor 41, performs those destined for internal operations, and passes vector operations to the Array Control Units 31. It also performs the arithmetic operations required for the pre-processing of vector parameters to be used in the Parallel Task Processor 41, and many of those operations that cannot efficiently be accomplished in parallel. Further, the SPU 20 performs those operations necessary to allocate the resources of the Parallel Task Processor 41 to the tasks in process. It enforces these both internally and over the units in its environment. Finally, the SPU 29 causes transfers between the Parallel Task Processor 41 elements via a descriptor sent to the File Memory Controller 47. Through the Control and Maintenance Unit 33, it requests the Front End Processor 25 to perform transfers external to the Parallel Task Processor 41. The scalar Processor Unit 29 includes a Local Memory 29 which performs temporary storage (buffering) for both operands of scalar operations and vector parameters. In the preferred embodiment, the operands of the scalar operations are stored in a 16 word by 48 bit register file which is accessed for word operation only. Two words may be simultaneously read while only one is written. Also in the preferred embodiment, vector parameters are temporarily stored in a 16 word by 120 bit random access memory which is accessed in a four word operation only for transfer thereof to the Array Control Unit 31 for further processing.

Figure 9:
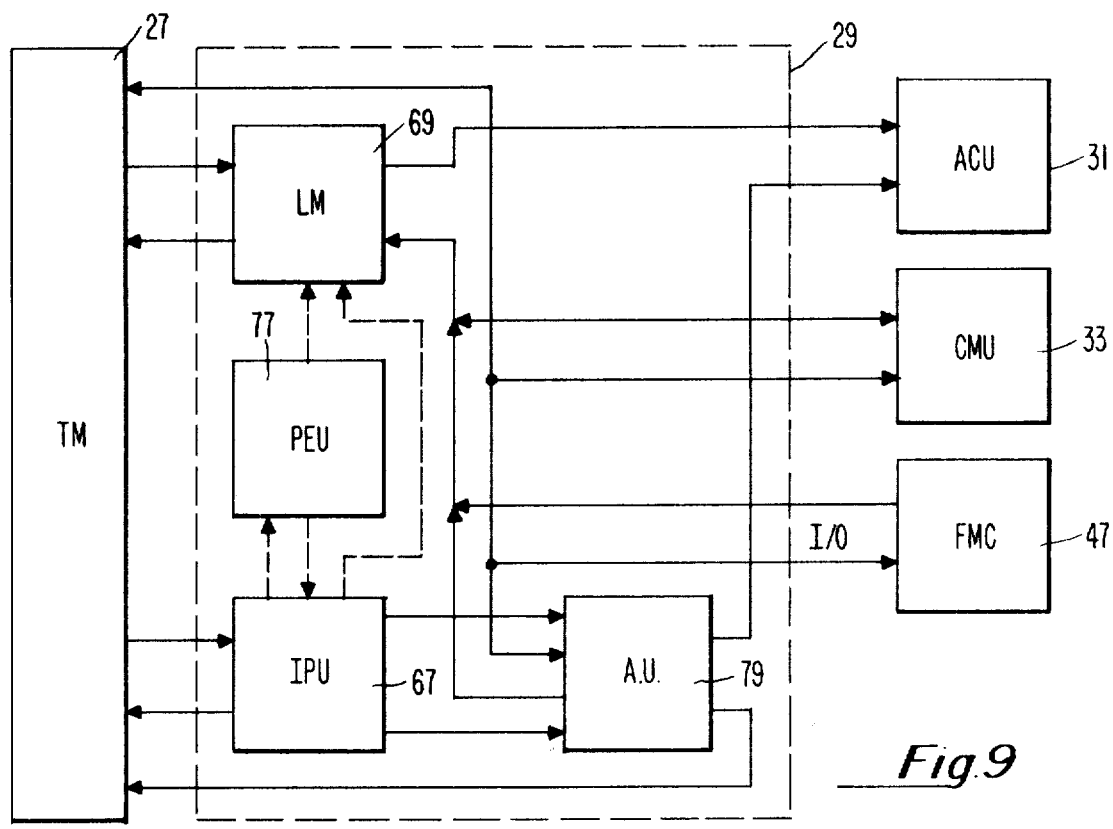
FIG. 9 is a block diagram depicting the scalar processing unit of the control unit shown in FIG. 1.

A processor environment unit 77 is provided for normal housekeeping operations such as maintaining the operational status of the Scalar Task Processor 29 via interrupt, synchronization and other standard techniques. As can be appreciated with respect to FIG. 9, a primary function of the Processor Environment Unit 77 is to provide the control interface between the Local Memory 69 and the Instruction Processing Unit 67.

The Instruction Processing Unit 67 performs instruction preparation by fetching four words in parallel from the Task Memory 27. The fetched words are buffered to assure a steady flow of instructions for branch free operation. Instructions are selected coincident with instruction execution. Branch capability exists to the extent of the buffering. Branches beyond that are penalized by Required Task Memory 27 accesses. Instructions are preferably in multiples of eight bytes. The Instruction Processing Unit 67 also controls instruction execution, Local Memory 69 addressing, and Scalar Processer Unit 29 interfacing.

Processing Unit 29 functions to implement the operand test and manipulation portions of the instruction set. Scalar operands are sourced from the Local Memory 29 and resultants are returned thereto. In addition to performing general arithmetic functions the Arithmetic Unit 79 of the preferred embodiment is also structured to quickly perform other more specialized functions such as: address index arithmetic, operand comparison (integer, Boolean, Normalized), addition and subtraction of integer operands and Boolean operations.

ARRAY CONTROL UNIT

The Array Control Unit 31, with reference to FIG. 1, buffers vector function parameters from the Scalar Processing Unit 29, performs validity checking and generates controls for the array 81 comprising the Array Memory 15, the Memory Interface 19, the Input Alignment Network 21, the Arithmetic Element 17, and the Output Alignment Network 23.

Various terms used for the specification of the Array Control Unit 31 are listed as follows:

Array Pipe comprises the following units as the stages. Central Indexing Unit (CIU), Memory Index Generator (MIG), AM, Input Alignment Network Tag Generator (IANTG), Input Alignment Network Cross-bar (IANCB), AE, Output Alignment Network Crossbar (OANCB), and Output Alignment Network Tag Generator (OANTG).

Vector Set is an ordered set of parallel vectors.

Vector Set Descriptor is a collection of items to specify vector set.

Bit Vector is an ordered set of data and each element of which is a bit.

Bit Vector Descriptor is a collection of items to specify bit vector.

Superword is a vector whose elements are fetched in parallel to be used by the AE's. The length of superword is equal to no. of AEs.

Vector Form is the specification of function. The operands for the function are vector sets, AE operators and bit vector. Results are vector sets and bit vector.

Vector function is the specification of function. The operands for the function are vector sets, AE operators and bit vector. Results are vector sets and bit vector.

A Template is a fixed pattern of controls for the array pipe. It consists of a sequence of template microwords. Each microword contains information to control various units of the array pipe. A template can execute one superword wide slice of a vector form.

Click: Central indexing on consecutive superword is called a click operation which is performed by the CIU.

Superclick: Central indexing on first superword of a vector in a set of parallel vectors is called a superclick operation and is performed by the CIU.

The Array Descriptor gives the base address and the number of elements in the array. Note this array appears in the program data organizations as dimensioned variable.

An Incset contains the parameters required to specify the elements of the vector set relative to the base of the array.

Vector conflict occurs when all elements of the vector are located in one memory module. Note that the elements of a superword of a vector will either all be in separate memory modules or they will all be in one memory module.

Vector operation is the execution of a vector form.

Figure 10:
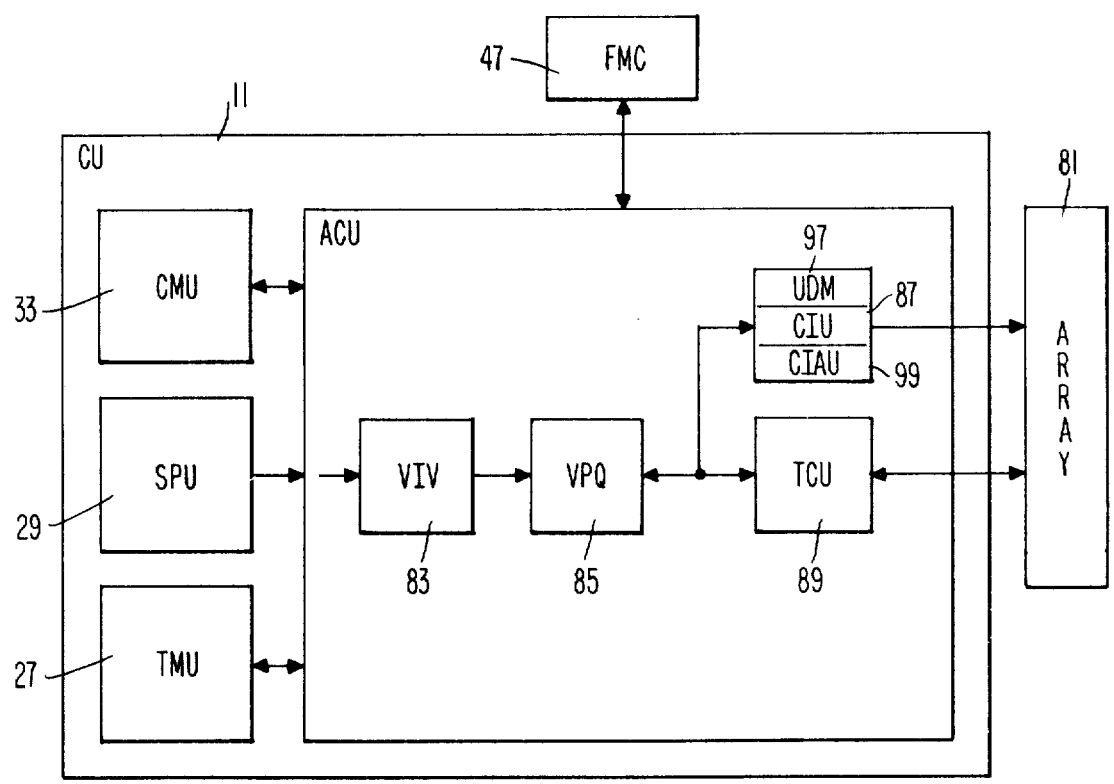
FIG. 10 is a diagram showing the array control unit of the control unit of FIG. 1.

The Array Control Unit 31 is positioned into four subunits, see FIG. 10; the Vector function initialization and Validation Unit 83, the Vector Function Parameter Queue 85, the Central Indexing Unit 87 and the Template Control Unit 89.

The VIV 83 accepts ACU 31 instructions from the SPU 29 and processes them for initialization and validation. A group of instructions describes a vector form (VF). Each instruction is validated to detect any inconsistent instruction in a group of instructions describing a VF. Processed parameters are put in the VPQ 85 and then they move to the CIU 87 or the TCU 89. The CIU 87 performs indexing operations to calculate initial values required by Array 81. The TCU 89 controls the CIU 87 and the Array 81 by means of templates and thus controls execution of VF. Scalar results are collected by the TCU 89 and then stored in the Task Memory 29.

The ACU 31 also communicates with Control and Maintenance Unit 33 for error logging, performance monitoring and diagnostics. I/O cycles are allocated on request from File Memory Controller 47.

Figure 11:
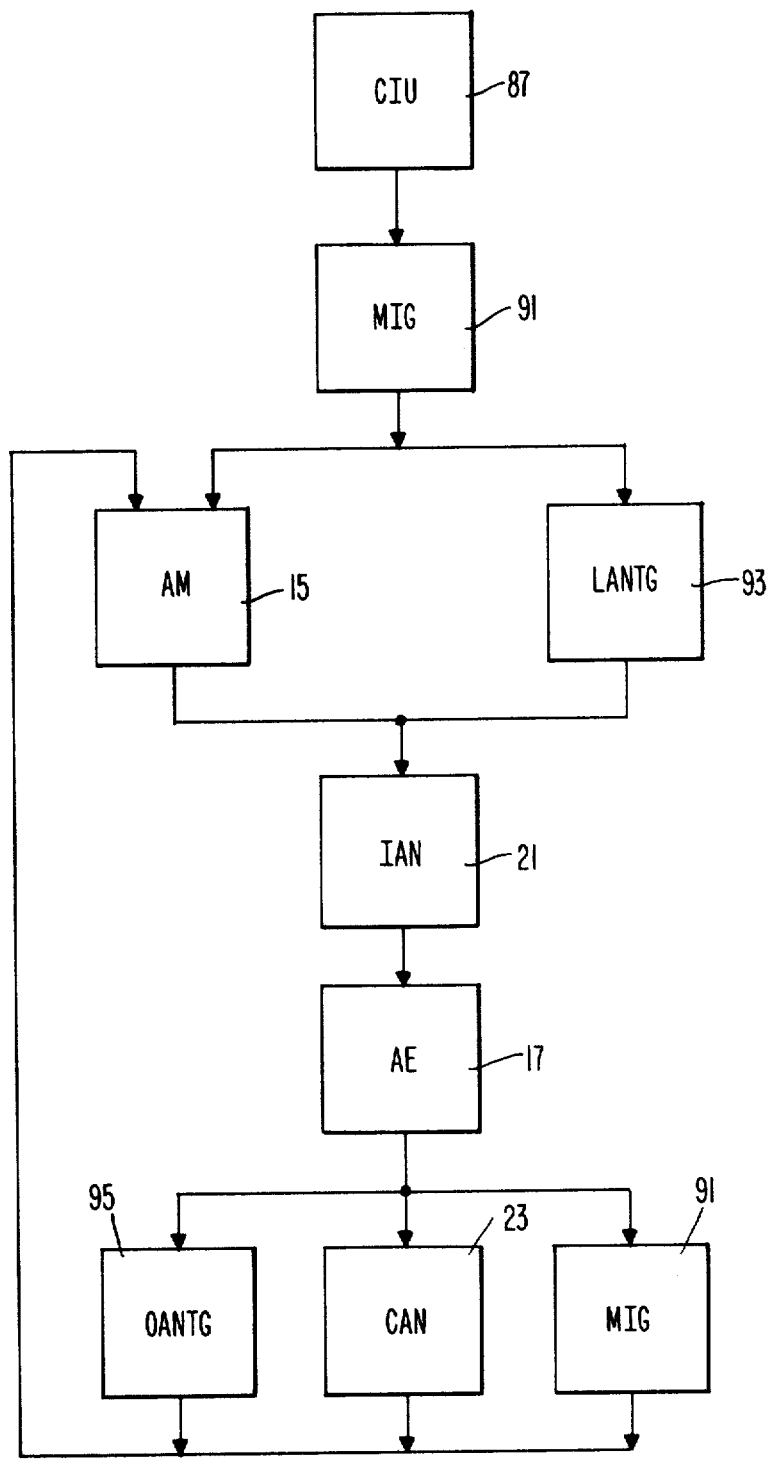
FIG. 11 is a function flow diagram illustrating a job flow through the parallel array of FIG. 1.

The ACU 31 controls the execution of vector forms on the Array 81, see FIG. 11 with reference to FIG. 1. Various stages in the Array 81 are Central Indexing Unit 87, Memory Index Generator 91, Input Alignment Network Tag Generator 93, Array Memory 15, Input Alignment Network 21, Arithmetic Element 17, (AE), Output Alignment Network Tag Generator 95, and Output Alignment Network 23. The CIU 87 generates parameters required by the MIG, IANTG and OANTG for the index and tag computations. The CIU 87 also performs horizontal slicing of Vector Form (VF) by performing clicking and superclicking operations. MIG 91 generates the indexes required for the AM 15 fetch and store operations. The IANTG 93 generates tags required for Input Alignment. The IAN 21 does unscrambling of vector elements from AM 15. The OAN is a counterpart of IAN and it transfers the elements of the result vector back to the AM 15.

Units in the Array 81 each take one major cycle for their operation and perform operations in this period. If In an operation requires extra cycle(s) then the TCU 89 will allocate sufficient cycles one at a time. These units get operands from an input buffer (not shown) and deposit results into the input buffer (not show ) of the next unit in the Array 81. These units can be interrupted at the end of a cycle since the state of the Array 81 is saved in buffers. Extra paths for I/O do not change the state of the Array 81 except for the array memory 15 addressing. Thus I/O can steal cycles whenever the addressing can be restored. The FMC 47 generates requests for I/O cycles.

The ACU 31 accepts various kinds of parameter groups from the SPU 29. Each parameter group is stored as one entry in VIV 83. The entry preferably consists of 125 bits of information. Each of these, see FIG. 12, is described below in detail.

1. Setup Array region bounds: with this entry the Scalar Processor Unit provides a Base of Space (BOS) and Length of Space (LOS) values for subsequent vector set functions.
2. Setup Vector Length Parameters: with this entry the SPU provides the values describing vector length (l) and iteration count (K).
3. Vector form descriptor: with entry the SPU provides condition bits, name of first template of vector function, operator names, sync bit information, and program counter.
4. Vector Set as a constant vector: this entry supplies a full word operand to be broadcast as a constant vector.
5. Vector Set descriptor: with this entry the SPU supplies the array descriptor (B, V) and the incset (i, d, D) for the vector set in array memory. The various fields are:
   A. The array descriptor:
      Relative Base Address (B) — compiler address in the user's array address space; and
      Array Volume (V) — the number of elements declared in the array; the product of the array dimensions; and
   B. and the Incset:
      Initial Element (i) — the index of the first element of the first vector to be addressed (zero originated);
      Element Displacement (d) — the address distance between successive elements of the vector; and
      Vector Displacement (D) — the address distance between initial elements of successive vectors.
6. Vector Set descriptor updated by array descriptor: The SPU supplies the new array descriptor to be combined with the previous vector set incset. The array descriptor is two half words.
7. Vector Set descriptor updated by initial element index. The SPU supplies the index of the new initial element to be combined with the previous array descriptor and incset. The initial element index is one half word quantity. Other bits are unused.
10. Vector Set descriptor updated by incset: The SPU supplies the new incset to be combined with the previous array descriptor. The incset consists of 3 half words. Other bits are unused.
11. Vector Set Result descriptor: The SPU supplies array descriptor and incset of a vector set result. Array descriptor and incset requires five half words.
12. Vector Set Result descriptor updated by array descriptor: The SPU supplies the new array descriptor for use with the incset of the previous vector set descriptor. The array descriptor consists of two half words, other bits are unused.
13. Vector Set Result descriptor updated by initial element index: The SPU supplies the index of the new initial element for use with array descriptor and incset of the previous vector set descriptor. The initial element index consists of one half word. Other bits are unused.
14. Vector Set Result descriptor updated by incset: The SPU supplies the new incset for use with previous array descriptor of the previous vector set descriptor. The incset consists of 3 half words. Other bits are unused.
15. Scalar Result to task memory: The SPU supplies the task memory base address and initial element where scalar result is to be returned. Element displacement is d.
16. Scalar Result to array memory: The SPU supplies the array descriptor, initial element index (i) and element displacement (d), indicating the address where scalar result is to be returned. This consists of four half words. Other bits are unused.
17. Random access descriptor I: The SPU supplies the base and length fields to the VIV. It consists of two half words. Other bits are unused.
20. Random access descriptor II: The SPU supplies only VIV Tag to the VIV consisting of five bits. Other bits are unused.

21. Bit Vector operand: The SPU supplies partial bit vector descriptor containing base address (BVB) and volume (BVV).
22. Bit Vector Result: The SPU supplies partial bit vector descriptor containing base address (BVB), volume (BVV) and TM address for bit vector parameter (TMADD) fields.
24. COMPRESSED VECTOR OPERAND: The SPU supplies the base (BC) (Starting element of the vector set) and length of the vector set (LC). Other three half words are unused.
24. COMPRESSED VECTOR RESULT: The SPU supplies the Base (BC). (Starting element of the vector set) and length of the vector set. (LC). Other three half words are unused.

As the VIV 83 reads each entry it receives the information either for entry in the internal registers of the VIV 83 or to be transmitted to the VPQ 85. Values in internal registers will be used during subsequent VIV 83 processing of vector operators and operands. The processing consists of absolute address computation and relative address validation. Before vectors may be processed, the Vector Form (VF) parameters are validated. Any bit vectors associated to a vector function are checked for self consistency. Certain housekeeping computations and checks are performed with each individual type of VIV 83 entry.

The major function of the VIV 83 is to provide early detection of logical errors in the vector function as opposed to delayed detection by Memory Indexing Alignment 21 or Arithmetic 17 Units. The sequence of vector instructions that are fed into the VIV 83 are examined for correctness in their ordering and association to individual vector functions. Each type of instruction has appropriate checks made to ensure the validity of the parameters supplied to describe the vector function. These checks are described in subsequent paragraphs.

Each instruction to the VIV 83 is processed by the VIV 83 in one major cycle. The VIV 83 contains local registers for storing parameters. An Instruction may modify values of some of the local registers. The local registers contents may be used to computer the fields to be transferred to the VPQ 85.

The Vector Parameter Queue (VPQ) 85 is a first-in-first-out queue. An entry for the VPQ 85 may be prepared by the VIV 83 every two or more minor cycles. An entry will be consumed at most every major cycle. The VPQ 85 is a passive unit in that it merely stores data presented to it but does not act on it.

The Central Index unit (CIU) 87 stores vector set descriptors, scalar descriptors, bit vector descriptor and compressed vector supplied by the VPQ 85, performs operations needed for clicking and superclicking, produces initial memory addresses, alignment network tags and constants. It also produces some control information for the Template Control Unit 89. The CIU 87 is subdivided into two subunits:
1. Vector Set Descriptor Memory (VDM) 97 which is the descriptor buffer and working storage for the Central Index Arithmetic Unit 99.
2. Central Index Arithmetic Unit (CIAU) 99 which performs necessary arithmetic operations and generates control information to the TCU 89.

In the preferred embodiment, the size of the VDM 97 is 16 words, each word consisting of 188 bits. Thus the VDM 97 holds up to 16 descriptors wherein each descriptor represents a complete vector set.

A vector set descriptor generally represents a vector set of Array Memory 15.

As shown in the figure, the scalar descriptor represents the vector result either to Array Memory 15 or Task Memory 27. In this case one value is generated every superclick.

The VDM 97 is used by two units of the ACU 31, namely, the Vector Parameter Queue (VPQ) 85 and the Central Index Arithmetic Unit (CIAU) 99. For the VPQ 85 the VDM 97 is a write only storage. The CIAU 99 reads data from the VDM 97 and after manipulating on certain fields, it writes back to the VDM 97. In addition, the VDM 97 also supplies addresses to the TCU 89.

The Central Index Arithmetic Unit (CIAU) 99 performs the following three operations:
1. Clicking and Superclicking operations for descriptor: When the length of a vector is more than a superword, central indexing for consecutive superwords is performed by updating certain fields. This operation is called click operation. This is simple to perform as the increment between successive elements ($d$) of the vector is the same and the starting element of the next superword can be calculated from the starting element of the previous superword by adding $d \cdot N$ where N is the length of a superword. The length of the vector is reduced by N elements every time a click is performed. In superclicking parallel vectors of a vector set are indexed by hardware. This is possible as all have the same '$d$' and the distance between the starting element of successive vectors is constant, denoted by D.
2. Initial Memory Addresses, Alignment Network Tag constants and indexing Constants: The CIAU 99 is required to generate three initial memory 15 addresses, alignment network 21 and 23 tags, and indexing constants. From these initial values and indexing constants, memory indices are calculated by the memory indexing generator 91.
3. Generation of control information for the TCU 89: The CIAU 99 supplies a control bit to the TCU 89 indicating the type of descriptor being involved. A logical zero control bit indicates a scalar result to the Task Memory 27 whereas a logical one control bit indicates a scalar/vector result to the Array Memory 15.

Figure 13:
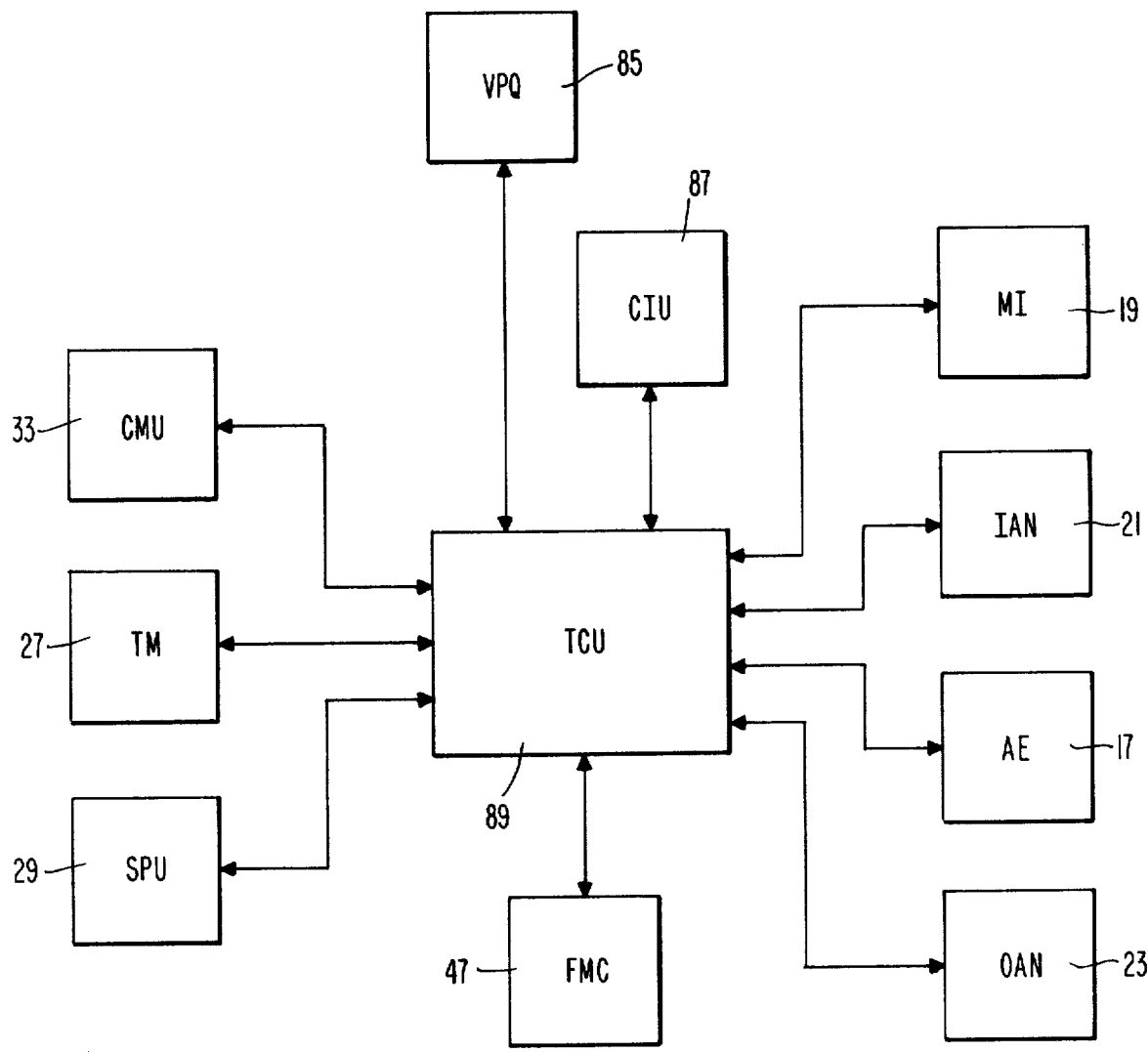
FIG. 13 is a block diagram of the template control unit of the array control unit shown in FIG. 10.

The Template Control Unit 89, see FIG. 13, functions to accept "vector form" requests from Vector Parameter Queue 85 and to control the execution of this "from" on the Array 81. Vector forms are performed by execution of a sequence of templates. The TCU 89 specifies the sequence of templates, initiates them properly and controls their execution using microprogrammed code for each template. The TCU 89 also controls Array Memory 15 cycles for I/O.

Since one vector form may require more than one template execution, the TCU 89 may be controlling different superword slices of the same vector form at a time. These templates are interfaced by the TCU 89 such that no conflict occurs in allocating array 81 pipe units to different templates, as described below.

Vector descriptors are stored in VDM 97 in sequence at increasing VDM 97 addresses. The sequence is bit vector operand (if any), Bit vector result (if any), first VD, second VD, etc. This order allows TCU 89 to compute VDM 97 address by following equation:

```
BVO address = x
BVR address = (x + OBVPRES) mod 16
nth VD address =   (x + (n−1) + OBVPRES + RVBPRES
                    mod 16
``` where x is the VDM 97 address of the first descriptor of the VF, OBVPRES = 1 only if operand bit vector is present and RBVPRES = 1 only if result bit vector is present.

The TCU 89 can produce a basic control word (BCW) every major cycle. This word is logical OR of up to 3 active templates microsequence words. Certain special conditions modify the resulting control word. The resulting control word specifies operations of the units in the Array 81 pipe.

Vector form requests from the VPQ 85 are accepted by the TCU 89 and are buffered therein.

A VF request from VPQ 85 consists of one "Write VF1" request and then after a few cycles another "Write VF2" request. The second request signifies a valid VF as checked by VIV 83.

A VFRFULL signal is sent to VPQ 85 if TCU 89 is fully buffered. The VPQ 85 will not send any request if the TCU 89 is fully buffered.

A VF is a sequence of templates. Execution of a template is performed by serially executing template microsequence cycle by cycle. The TCU 89 fetches 3 microwords (maximum 3 templates may be executing in parallel) one major cycle before the units in pipe are to receive control signals.

An access to superword with all its elements in one memory 15 module requires one memory cycle for each element access. If any operand or result vector has a vector conflict (VC) then the VIV 83 detects it and sets a condition bit in the TCU 89. The TCU 89 while processing such a VF will force superword size to be 1 for CIU 87 indexing. Thus, only one element slice of VF is processed by each template. This makes the execution time to be about N times the execution time without a VC. N is the superword size of the template assuming no VC.

Template microsequence code assumes that the AE 17 operation time is two major cycles but certain operations (e.g., 1/x, divide, etc.) the AE 17 requires longer operation time. The AE 17 operation time is an integer multiple of the major cycle. The TCU 89 adjusts the generated microsequence to allow different AE 17 operation times. Long AE 17 operators have two control bits indicating the time to finish (TF) to be greater than 1, 2 major cycles. Such condition inhibits incrementing of the template microsequence. The timing relationships are explicit in the templates. Certain AE 17 operations require only one major cycle and template will explicitly allocate only one cycle.

A scalar result is specified by a special bit in vector descriptor (VD) in VDM 87. The VD also specifies the destination to be the AM 15 or TM 27. The CIU 87 sends a signal to TCU 89 if the result destination is the TM 27. In this case, the CIU 87 deposits the destination address in the CIU 87 and modifies VD in VDM. The TCU on receipt of this signal inhibits AM store cycle for scalar result. The data path from OAN is tapped by the TCU. Under TCU control scalar result from OAN and the destination address from CIU are buffer loaded. Then, TCU sends it to the specified address in TM. A Scalar result is always obtained from AE-0, but for diagnostic purposes any AE can be selected.

Memory cycles for I/O are allocated by TCU. A free memory cycle is referred to as a "hole" If a hole is not found, operations in CIU, MIG, IAN, AE, and OAN are stopped for a cycle and status of these units is kept frozen. The vector operation continues after this freeze. This kind of cycle stealing is referred to as "vertical freeze". Memory cycles for I/O are allocated only when demanded by the FMC 47. For I/O requests, holes are searched for 8 cycles and if no hole is found, a vertical freeze is used during the eighth cycle.

CONTROL AND MAINTENANCE UNIT

The fourth and final unit within the Control Unit 11 is the Control and Maintenance Unit 33. This unit monitors the Parallel Task Processor 41 in terms of hardware status and performance. Maintenance logs are kept which automatically logs errors and the locations thereof. Eventually, the error data is transferred to the Front End Processor 25 for final storage or analysis. Also, for performance evaluation purposes, hardware use statistics are logged. Normally, the use statistics are transferred to the Front End Processor 25 at the end of each program but the transfer may be preprogrammed to occur at intermediate program points for examining specific operating details of a given program Communications (both input and output) with the Front End Processor 25 is handled through appropriate communication buffering techniques within the CMU 33. Normally, The Scalar Processing Unit 29 provides the control intelligence for the Control Unit 11.- However, in the preferred embodiment, the CMU 33 includes the capacity to execute a primitive set of instructions which allow it to perform its monitoring tasks and to seize control of the Scalar Processing Unit 29 for cold starting, for fatal error conditions, and for debug single stepping control purposes.

ARRAY

Parallel or vector operations occur in the Array 81.

A complete disclosure of the apparatus and operation of "Multidimensional Parallel Access Computer Memory System" suitable to implement the Array 81 is given in copending U.S. Patent Application, Ser. No. 682,526, filed May 3, 1976, by D. H. Lawrie and C. R. Vora and assigned to the assignee of the present invention. The above-cited Ser. No. 682,526 patent application is incorporated herein by reference.

With reference now to FIG. 1, vector elements are stored in the Array Memory 15 comprising in the preferred embodiment 17 memory modules each implemented as LSI bipolar devices. The prime number 17 preserves the desired conflict free access characteristic of Applicants' invention. An Array Memory 15 comprises 56 bits and includes Hamming code for one bit error correction. Preferably, the Array Memory 15 accommodates one megaword.

The vector elements stored in the Array Memory 15 are accessed in parallel via the Memory Indexing Generator 91 in the Memory Interface 19. The accessed vector elements are then aligned with the appropriate Airthmetic Element 17 module via the Input Alignment Network 19 as directed by the Input Alignment Network Tag Generator 93. The Input Alighment Network 19 as implemented in the form of a 56 bit crossbar.

Vector operations are organized as sequences called templates which are executed in locked-step fashion in the Arithmetic Element 17 under the control of a microsequence 101 functioning in response to the Template Control Unit 89 as above-described. Simple combinatorial logic sequences serve as an efficient approach to process a plurality of distinct instructions in each Arithmetic Element 17 module. Arithmetic operations such as floating point add, subtract, or multiply are rapidly performed on the vector elements.

Vector results are returned to the Array Memory 15 via an alignment process in the Output Alignment Network 23 corresponding to the above-described alignment process in the Input Alignment Network 19.

EPILOG

Although the present scientific parallel processing architectural invention has been described with a certain degree of particularity, it should be understood that the present disclosure has been made by way of example and that changes in the combination and arrangement of parts obvious to one skilled in the art, may be resorted to without departing from the scope and spirit of the invention.

What is claimed is:

1. A single instruction multiple data processor comprising:
    a large scale high level language programmable general purpose front end processor for user interfacing, archival storage and scalar task processing;
    a parallel array processor having a parallel memory module array, a parallel array of arithmetic elements and an alignment network for aligning particular memory modules in said array thereof with particular arithmetic elements in said array thereof for parallel processing of linear vectors;
    a large high speed secondary storage system having a high speed data channel connected to said front end processor and a high speed data channel connected to said parallel memory array; and
    a control unit interconnected to said front end processor, said high speed secondary storage system and said parallel array processor for controlling said parallel array processor, said control unit comprising
    a task memory for storing object program code for use in parallel processing;
    a scalar processing unit for fetching object program code from said task memory and for issuing instructions in response thereto;
    an array control unit for controlling said parallel task processor in response to instructions issued by said scalar processor; and
    a control maintenance unit for providing communications between said front end processor and said control unit, for providing initialization and maintenance control for said control unit, and for gathering error and use data from said control unit, said secondary storage system, and said parallel array processor and for communicating gathered error and use data to said front end processor.

2. The single instruction multiple data processor according to claim 1 wherein
    said memory module array comprising an array of seventeen identical memory modules functioning in parallel;
    said parallel array of arithmetic elements comprises an array of sixteen identical arithmetic elements functioning in locked step operation; and
    said alignment network comprises input alignment means for providing data communication paths from said memory module array to said parallel array of arithmetic elements; and
    output alignment means for providing data communications paths from said parallel array of arithmetic elements to said memory module array.

3. The single instruction multiple data processor according to claim 1 wherein said large high speed secondary storage system includes:
    a file storage unit for providing high performance dedicated secondary storage; and
    a file memory controller for providing buffering and interfacing between said file storage unit and said front end processor, said parallel memory module array and said control unit.

4. The single instruction multiple data processor according to claim 1 wherein
    said task memory includes a random access storage system.

5. The single instruction multiple data processor according to claim 4 where said scalar processing unit includes
    an arithmetic unit for performing general scalar arithmetic functions.

6. The single instruction multiple data processor according to claim 1 wherein said array control unit includes:
    means for addressing said parallel memory array;
    means for directing said alignment network in its function of aligning particular memory modules in said array thereof with particular arithmetic elements in said array thereof; and
    means for initiating particular arithmetic operations in said parallel array of arithmetic elements.

7. The single instruction multiple data processor according to claim 1 wherein
    said task memory is a random access storage system;
    said scalar processing unit includes
        an arithmetic unit for performing general scalar arithmetic functions; and said array control unit includes
    means for addressing said parallel memory array;
    means for directing said alignment network in its function of aligning particular memory modules in said array thereof with particular arithmetic elements in said array thereof; and
    means for initiating particular arithmetic operations in said parallel array of arithmetic elements.

8. The single instruction multiple data processor according to claim 1 wherein
    said memory module array consists of a prime number of memory modules; and
    said parallel array of arithmetic elements consists of a power of two number of arithmetic elements.

9. The single instruction multiple data processor according to claim 1 wherein said alignment network comprises:
    input alignment means including a crossbar network for providing a data communications path between any particular memory module in said array thereof with any particular arithmetic element in said array thereof; and
    output alignment means including a crossbar network for providing a data communications path between any particular arithmetic element in said array thereof with any particular memory module in said array thereof.

* * * * *